United States Patent

Mundy

[15] 3,705,390

[45] Dec. 5, 1972

[54] CONTENT ADDRESSED MEMORY CELL WITH SELECTIVE BIT WRITING

[72] Inventor: Joseph L. Mundy, Schenectady, N.Y.

[73] Assignee: General Electric Company

[22] Filed: May 26, 1971

[21] Appl. No.: 146,967

[52] U.S. Cl..........340/173 AM, 340/173 R, 307/238, 307/279

[51] Int. Cl.........................G11c 11/40, G11c 15/00

[58] Field of Search.....340/173 R, 173 FF, 173 AM; 307/238, 279

[56] References Cited

UNITED STATES PATENTS 3,593,037 7/1971 Hoff....................................307/238

*Primary Examiner*—Terrell W. Fears

*Attorney*—Richard R. Brainard, Paul A. Frank, Charles T. Watts, Paul F. Wille, Frank L. Neuhauser, Oscar B. Waddell and Joseph B. Forman

[57] ABSTRACT

A content addressed memory is disclosed in which the information may be changed or stored on a bit-by-bit basis rather than on a word-by-word basis. This is accomplished by utilizing a cascading circuit arrangement in which the storage node of the charge storage memory is isolated from the "word" line by at least one, intermediate, isolated node. In addition, the exclusive-OR function used to obtain a content addressed memory is achieved utilizing the storage transistor and only two additional transistors in each memory cell.

10 Claims, 9 Drawing Figures

INVENTOR
JOSEPH L. MUNDY
BY Paul F. Wille
HIS ATTORNEY

INVENTOR
JOSEPH L. MUNDY
BY Paul F. Wille
HIS ATTORNEY

CONTENT ADDRESSED MEMORY CELL WITH SELECTIVE BIT WRITING

This invention relates to semiconductor memories, and, in particular, to the type of memory known as a Content Addressed Memory (CAM).

As originally devised, a computer memory stored information on the basis of an address; i.e., the location of information in the memory was known, although the contents of the information was not. With this type of storage, processing is carried out sequentially, on a step-by-step basis.

As the required or desired speed of the computer was pushed higher, it was apparent that other means had to be devised for storing the information. This led, in the mid-1950's, to the idea of an associative memory array formed by adding an "exclusive OR" function to each site in the storage array. This type of memory is, in a sense, the opposite of the former type: here the address is not known and the information is.

However, a means for feasibly implementing the associative memory concept was lacking. With the advent and advances of large scale integrated circuit technology, this means is now available. Utilizing large numbers of metal-oxide-semiconductor (MOS) devices on a single chip of semiconductor, associative memories are able to search for and find information at relatively high rates in a parallel processing method.

An "associative search" in an associative or content addressed memory is essentially a matching operation between a quantity of input information and the information stored in the memory. If the sets of information match, a suitable output signal is produced.

A difficulty with such memories is that the information is stored in quantity, e.g., on a word-by-word basis. If it is desired to change any portion of the stored information, the entire word must be read and rewritten. This consumes a needless amount of time.

Another consideration in the implementing of a content addressed memory is the size of the individual cells that make up the memory. Flip-flop types of memory cells tend to take up more area of the semiconductor wafer than do dynamic or charge storage memory cells.

In addition, due to the nature of the MOS devices utilized in a dynamic memory, voltage losses occur which slow down the memory, by lowering the voltage to which different points in the memory can charge, and decrease the amplitude of the output signal. In dynamic memory cells, the voltage losses reduce the amount of charge available for storage, in addition to increasing the read out time or the time for a match or mismatch of information to be indicated.

In view of the foregoing, it is therefore an object of the present invention to provide a high speed content addressed memory.

Another object of the present invention is to provide a content addressed memory capable of selective bit writing.

A further object of the present invention is to provide a content addressed memory in which information can be written a single bit at a time.

The foregoing objects are achieved in the present invention wherein there is provided a five transistor, dynamic, content addressed memory in which the storage node is isolated from the "word" line by another isolated node. Specifically, three MOS transistors are connected in a cascading relationship (source of one to the gate of the next) between "mask" and "flag" access lines to the memory cell. Isolating the source of the last transistor in the cascade from the "-flag" line is a diode formed by a fourth transistor having its source and gate connected together. The source of the last transistor in the cascade is connected to a "-mask" access line by the source-drain path of a fifth transistor. The "word" access line is connected to the gate of the first transistor in the cascade. The gate of the third transistor in the cascade forms the storage node of the cell.

A more complete understanding of the present invention may be obtained by considering the following detailed description in conjunction with the accompanying drawings, in which:

FIG. 1*a* illustrates one embodiment of the present invention in standard MOS symbolism.

FIG. 1*b* illustrates the same embodiment of the present invention in "bubble" symbolism.

Figure 4A:
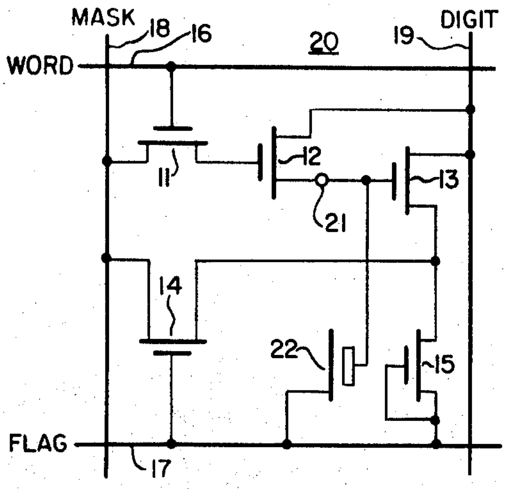

FIG. 4*a* illustrates another embodiment of the present invention utilizing a MOS voltage variable capacitor.

Figure 4B:
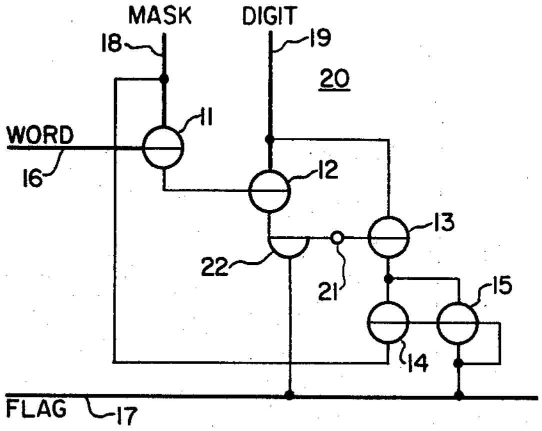

FIG. 4*b* illustrates in "bubble" symbolism the same embodiment as FIG. 4*a*.

Figure 5:
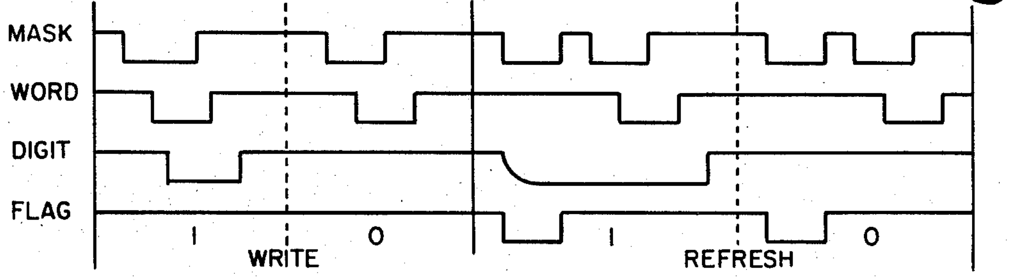

FIG. 5 illustrates alternative signal waveforms for the WRITE operation and the signal waveforms utilized in the self-REFRESH operation.

Figure 6A:
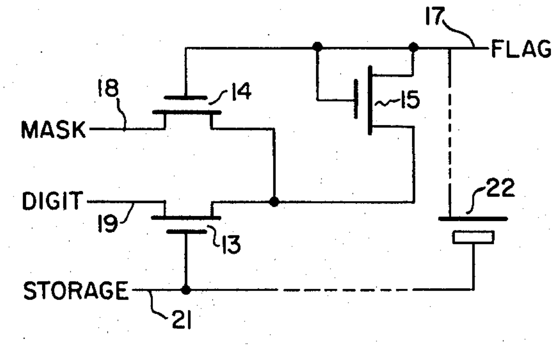
Figure 6B:
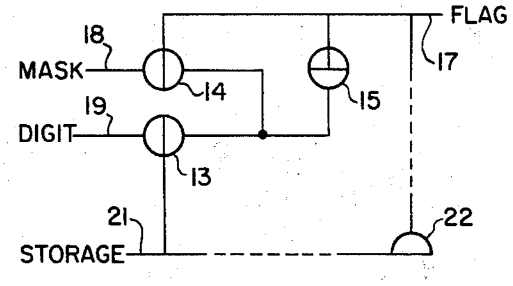

FIGS. 6*a* and 6*b* illustrate the exclusive-OR logic in the memory cell of the present invention.

Figure 1A:
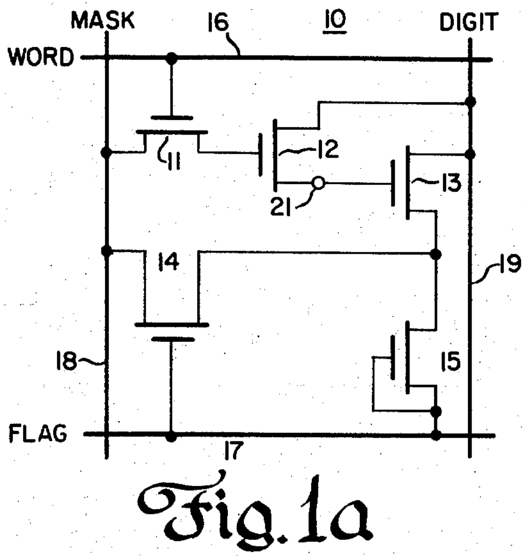
Figure 1B:
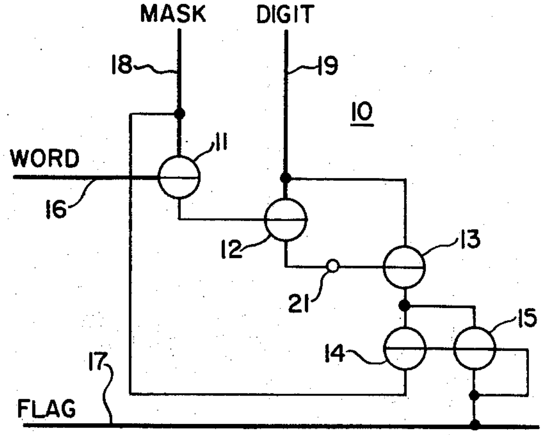

FIGS. 1*a* and 1*b* illustrate one embodiment of the present invention utilizing two different electronic symbols for the MOS devices utilized in the memory cell. FIG. 1*a* utilizes the more or less conventional symbol for an MOS field effect transistor. FIG. 1*b* utilizes a "-bubble" symbolism that is receiving a widespread and increasing acceptance in the scientific community due to ease with which digital and/or logic circuitry can be represented. FIGS. 1*a* and 1*b* schematically illustrate the same electronic circuit.

In FIGS. 1*a* and 1*b* memory cell 10 comprises, basically, three transistors connected in a cascading relationship between a first pair of access lines and having a second pair of access lines coupled to supply current to the cascaded transistors.

Specifically, memory cell 10 comprises transistors 11, 12 and 13 connected in a cascading relationship. That is, the gate of transistor 11 is connected to word line 16, the source of transistor 11 is coupled to the gate of transistor 12 which in turn has its source coupled to the gate of transistor 13. The source of transistor 13 is coupled to flag line 17 by transistor 15 having its source and gate connected together thereby forming a diode. Also coupled to the source of transistor 13 is transistor 14 having its source-drain path connected between mask line 18 and the source of transistor 13. Mask line 18 supplies current to the source-drain path of transistor 11 and digit line 19 provides current to the source-drain paths of transistors 12 and 13. The gate of transistor 13 forms storage node 21 of memory cell 10. As readily seen by inspection of FIGS. 1*a* and 1*b*, storage node 21 is isolated from word line 16 by an intermediate storage node formed by the gate of transistor 12.

The designations "word," "flag," "mask," and "digit" for access lines 16–19 are the arbitrary although more or less conventional designations for these access lines. In addition, the designations, "source" and "drain" are also more or less arbitrary since a MOS field effect transistor is a symmetrical device in which the source and drain cannot be distinguished by inspection, that is they are structurally identical. However, in operation, the source electrode is generally considered the electrode having the lower voltage thereon. In some operations, therefore, the designations of the electrodes will be reversed due to the reversal in the direction of current flow through the device. Also, unless otherwise stated, it is assumed that the potential on the various access lines and transistors is ground potential or some system reference potential. The signals on the access lines and within the memory cell itself may be either positive or negative depending upon the type of MOS transistor utilized in carrying out the present invention. Thus, for example, where "p-channel" MOS transistors are utilized, a "high" voltage or voltage pulse refers to a negative voltage whereas for "n-channel" MOS transistors a high voltage refers to a positive voltage.

Figure 2:
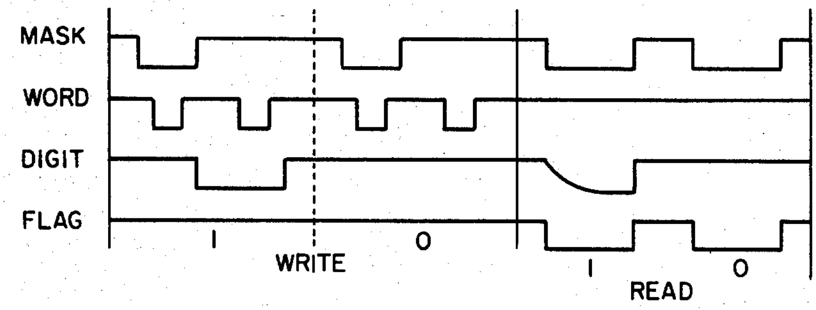
FIG. 2 illustrates the signal waveforms for the WRITE and READ operations.
Figure 3:
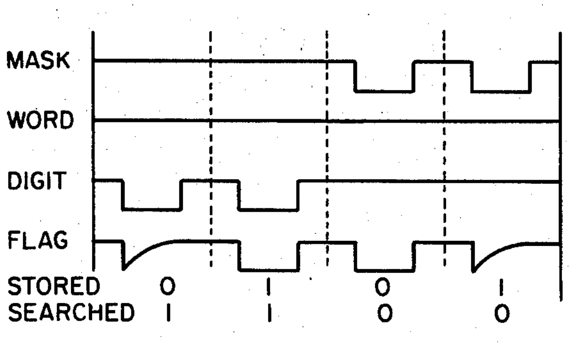
FIG. 3 illustrates the signal waveforms for the SEARCH operation.

Four operations are carried out by memory cell 10. These are WRITE, READ, associative SEARCH and REFRESH. Signal waveforms for these operations are illustrated in FIGS. 2 and 3, which may be considered in conjunction with the following detailed description of the operation of memory cell 10.

The WRITE operation is accomplished by raising the potential of write line 16 and mask line 18. The pulse on write line 16 places transistor 11 in an on condition enabling it to conduct charge from mask line 18 to the gate of transistor 12. The charge so conducted by transistor 11 is stored on the gate of transistor 12 as an intermediate storage node. Depending upon whether a logic "1" or a logic "0" is intended to be written, a pulse is or is not, respectively, applied to digit line 19.

Assuming that the storage of charge on storage node 21 represents a logic "1," then for the storage of a logic "1" a pulse is applied to digit line 19. Since transistor 12 has charge stored on the gate thereof, transistor 12 is in an on condition and conducts a current from digit line 19 to storage node 21. Prior to the pulse on digit line 19, first the pulse on word line 16 and then the pulse on mask line 18 are terminated, thereby isolating the intermediate storage node from lines 16 and 18. After storage node 21 is charged from digit line 19, word line 16 is again raised in potential thereby coupling the intermediate storage node of transistor 12 through transistor 11 to mask line 18. Since mask line 18 is at ground or reference potential, the intermediate storage node is discharged thereby turning off transistor 12.

Since storage node 21 of memory cell 10 is isolated from word line 16 by transistor 11 and the intermediate storage node formed by the gate of transistor 12, the bit stored in memory cell 10 or the bits stored in other memory cells that are also connected to word line 16 in a memory matrix, may be altered without changing the information stored within a particular memory cell. For example, assuming a memory cell also connected to word line 16 were to have the information therein modified, the activation of word line 16 would not disturb the information stored on storage node 21. The last step of the write cycle, in which word line 16 is activated and mask line 18 is held at ground potential, transfers the charge stored on the gate of transistor 12 to ground. Thus changing a bit of information in a word does not modify the information stored by the other cells connected to the same word line. In a similar manner, if the information stored in memory cell 10 were to be changed, the remaining bits in the word would not be modified.

The READ operation is essentially a determination of whether or not transistor 13 is in an active or an inactive state. The READ operation is accomplished as follows: the voltage on flag line 17 and mask line 18 is raised and digit line 19 is monitored to determine whether or not there is current flowing through transistor 13. A high potential on flag line 17 turns on transistors 15 and 14 since the gates of these transistors are connected together to flag line 17. The current flowing through transistor 14, from mask line 18, and the current flowing through transistor 15, from flag line 17, are combined in flowing through transistor 13 to digit line 19, thereby charging digit line 19. The charging of digit line 19 indicates that transistor 13 is in the active state and that a logic "1" is stored.

If a logic "0" were stored, then transistor 13 would be in an off condition and no current could flow therethrough to charge digit line 19. No current would flow through transistors 14 and 15 since flag line 17 and mask line 18 are at approximately the same potential.

The associative SEARCH operation is carried out by applying the searched for information on the mask and digit lines of a word and monitoring the output signal, if any, on flag line 17 to determine whether or not the word searched for is contained within the memory cells on line 16.

Specifically, assuming a logic "1" is being searched in memory cell 10, then digit line 19 is raised in potential and mask line 18 is held at ground potential. With this combination of input signal on lines 18 and 19, one may obtain two output signals depending upon whether or not a logic "1" is stored within memory cell 10.

During the search operation, flag line 17 is charged and allowed to "float"; that is, flag line 17 is not directly coupled to a source of voltage so as to maintain flag line 17 at a particular potential. Assuming that a logic "0" is stored in memory cell 10, then transistor 13 is in an off condition due to the absence of charge on storage node 21. Since mask line 18 is at ground potential, and the voltage on flag line 17 turns on transistors 14 and 15, then there is a conductive path from flag line 17 through transistor 15 and transistor 14 to mask line 18. This conductive path discharges flag line 17 indicating a mismatch between the searched for information and the information stored in memory cell 10.

Assuming, however, that a logic "1" is being searched, and a logic "1" is stored in memory cell 10, then the charge stored in storage node 21 turns on the transistor 13 thereby coupling the junction of transistors 14 and 15 to digit line 19. Since current can now flow through transistor 13 the voltage on flag line 17 is not dissipated since the voltage at the source of transistor 13 is approximately the same as the voltage on flag line 17. Thus, transistor 15, while capable of conducting, does not conduct current. Rather the current flows from digit line 19 through transistor 13 and transistor 14 to mask line 18. The absence of a discharge on flag line 17 indicates a match between the searched information and the information stored in memory cell 10. In actual practice, due to the voltage drops occuring in memory cell 10, flag line 17 could actually discharge slightly but not sufficiently so as to cause an indication of a mismatch when a match actually exists.

The search for a logic "0" is similar. However, in this case mask line 18 has a high potential thereon and digit line 19 is maintained at approximately ground potential. Assuming that a 0 is stored on storage node 21, the activation of transistors 15 and 14 by the high voltage on flag line 17 has no effect since mask line 18 also has a high voltage thereon. Thus, flag line 17 does not discharge thereby indicating a match between the stored information and the search information.

If, however, a one is stored on storage node 21, then transistor 13 is in an on condition and flag line 17 discharges through transistors 15 and 13 to digit line 19, which is maintained at approximately ground potential.

The information on storage node 21 is refreshed by reading the information from memory cell 10, amplifying the output signal from memory cell 10, and returning it to storage node 21 in a WRITE operation.

FIGS. **4*a* and 4*b*** illustrate a modification of a memory cell in accordance with the present invention, wherein a voltage variable capacitor is utilized within the memory cell.

In FIGS. **4*a* and 4*b* memory cell 20 comprises all of the elements illustrated and described in connection with FIGS. 1*a* and 1*b*. In addition, voltage variable capacitor 22 is connected between storage node 21 and flag line 17**.

As noted above in connection with FIGS. **1*a* and 1*b*, FIG. 4*a* illustrates the present invention in conventional MOS field effect transistor symbolism. FIG. 4*b* illustrates the present invention in the so called "bubble" symbolism. Voltage variable capacitor 22 comprises a source and gate structure from a MOS device and is illustrated in FIG. 4*a* utilizing the approximately the same style of symbolism as utilized for the other elements of memory cell 20. In FIG. 4*b* voltage variable capacitor 22** is illustrated as comprising half of the bubble utilized to represent a MOS device.

Voltage variable capacitor 22 may be fabricated simultaneously with the other elements of memory cell 20 and comprises a drain formed in the substrate of semiconductive material utilized in making memory cell 20. Slightly overlying the drain is an enlarged gate structure comprising an insulating layer having a metal layer thereover. The gate structure is connected to the gate of transistor 13 which forms storage node 21.

In operation, a voltage applied to storage node 21 that is sufficient to turn on transistor 13 also activates voltage variable capacitor 22, inducing an inversion layer underneath the gate structure in the semiconductor substrate. The inversion layer is coupled to the drain electrode and forms one electrode of the capacitor. The metal layer utilized in the gate structure forms the other electrode of the voltage variable capacitor.

The capacitance exhibited by voltage variable capacitor 22 is determined by the area of the gate electrode and the nature of the insulating layer. In the off condition the inversion layer is absent and the capacitance between the source and gate of voltage variable capacitor 22 is limited to the small region of overlap between the gate and the drain electrodes. A more detailed description of voltage variable capacitor 22 including several modifications of the basic structure is disclosed and claimed in copending application Ser. No. 146,966, filed May 26, 1971, and assigned to the same assignee of the present invention.

The operation of memory cell 20 is similar to that of memory cell 10 except that voltage variable capacitor 22, by coupling the voltage on flag line 17 to storage node 21, greatly increases the speed of memory 20 as compared to memory cell 10. Signals having the waveforms illustrated in FIGS. 2 and 3 may be utilized in the operation of memory cell 20. However, these are not the only signals that will produce the WRITE, READ, SEARCH AND REFRESH operations in memory cells 10 and 20; other waveforms may be used. For example, alternative WRITE signal waveforms are illustrated in FIG. 5 in which a single pulse per WRITE cycle is applied to word line 16. Also illustrated in FIG. 5 are the signal waveforms for the self-REFRESH operation, which is unique to memory cell 20.

The WRITE operation in memory cell 20 is similar to that used in memory cell 10 with flag line 17 held at ground potential. Mask line 18 and then word line 16 are raised, thereby charging the gate of transistor 12, turning transistor 12 on. Mask line 18 is lowered and digit line 19 is raised, thereby charging storage node 21 through transistor 12. Since word line 16 is still raised, but mask line 18 has been returned to ground potential, the gate of transistor 12 is discharged after storage node 21 is charged. Word line 16 and then digit line 19 are lowered, thereby completing the WRITE operation. By utilizing a single pulse on word line 16 to charge and discharge the gate of transistor 12, the peripheral circuitry of the memory can be simplified somewhat.

During the READ operation, in which pulses are applied to the flag and mask lines and the digit line is monitored, voltage variable capacitor 22, when in the on state, serves to couple the voltage applied to flag line 17 to storage node 21. The increased voltage applied to the gate of transistor 13 serves to more fully turn on transistor 13, enabling a greater current to flow through transistors 15 and 13 to digit line 19. The greater current therefore charges digit line 19 faster, enabling an indication of the state of transistor 13 to be obtained in a shorter interval of time. Also the digit line rises to a higher voltage than that stored on storage node 21. This allows self-refreshing, to be more fully described below. The foregoing assumes that a logic "1" has been stored on storage node 21, thereby placing transistor 13 in an active condition.

With a logic "0" stored on storage node 21, transistor 13 and voltage variable capacitor 22 are in an off condition. Thus, the application of a pulse on flag line 17 during the read operation has no effect on the state of transistor 13 since voltage variable capacitor 22 is in a low capacitance state and couples an extremely small amount of the signal on flag line 17 to storage node 21. Thus, for a logic "0" stored on storage node 21, voltage variable capacitor 22 is effectively removed from the circuit so that memory cell 20 performs in the same manner as memory cell 10.

In a similar manner the presence of a voltage variable capacitor 22 enhances the operation of memory cell 20 during an associative SEARCH. For example, with a logic "1" stored on storage node 21, voltage variable capacitor 22 is in an active or high capacitance state thereby coupling the voltage on flag line 17 to storage node 21. The voltage from flag line 17 is additively combined with the voltage at storage node 21 to more fully turn on transistor 13. Since transistor 13 is able to more fully conduct, the voltage at the source thereof is higher, thereby eliminating the slight discharge that takes place from flag line 17 when the stored and searched information match or allowing a higher flag voltage and, hence, greater speed. Thus, current can readily flow from digit line 19 through transistors 13 and 14 to mask line 18 without withdrawing charge from flag lines 17.

Similarly, when a logic "1" is stored on storage node 21, and a logic "0" is searched, the discharge of flag line 17 takes place more rapidly due to the voltage on flag line 17 being coupled by voltage variable capacitor 22 to the gate of transistor 13. Initially at least, transistor 13 is more fully turned on, thereby carrying a greater amount of current so as to more rapidly discharge flag line 17 to digit line 19 which is at the logic "0" voltage level. When a logic "0" is stored on storage node 21, voltage variable capacitor 22 is in a low capacitance state and is effectively removed from the circuit of memory cell 20. Thus, the associative SEARCH operation of memory cell 20 with a logic "0" stored is the same as for memory cell 10. That is, with a logic "0" stored and a logic "0" searched, flag line 17 remains high; with a logic "0" stored and a logic "1" searched, flag line is discharged.

An additional property of memory cell 20, in contrast to memory cell 10, is that memory cell 20 can be "self-refreshed," that is memory cell 20 can be refreshed without the use of external refreshing circuitry. The REFRESH operation for memory cell 20 generally comprises the reading of the information stored on storage node 21 and transferring this information to digit line 19. A WRITE operation is then performed which transfers the information on digit line 19 to storage node 21.

Specifically, assuming a logic "1" is stored on storage node 21, transistor 13 is in an on condition as is voltage variable capacitor 22. The application of signals to flag line 17 and mask line 18 turns on transistors 14 and 15 and causes current to flow through transistor 13 to digit line 19. Transistor 15 is also turned on and adds charging current. Digit line 19, which is initially at the zero logic level, is allowed to "-float," and therefore charges due to the currents from flag line 17 and mask line 18. The pulse on flag line 17 is coupled by way of voltage variable capacitor 22 to storage node 21 where it is additively combined with the voltage level on storage node 21 to more fully turn on transistor 13, thereby allowing transistor 13 to more fully conduct. Flag line 17 is then returned to the zero logic level and digit line 19 contains the logic "1" information from storage node 21. It should be noted that storage node 21 has not been discharged during this time but merely serves to activate transistor 13.

A WRITE operation is then carried out in which word line 16 is activated thereby coupling the voltage on digit line 19 to the gate of transistor 13 by way of transistor 12. Due to the voltage stored on the gate of transistor 12, transistor 12 is in an on condition and conducts current from digit line 19 to storage node 21, thereby refreshing the information stored on storage node 21 by adding thereto the charge lost since the last refresh operation. The pulse on mask line 18 is terminated, coupling the gate of transistor 12 to the logic "0" voltage level. This discharges the intermediate storage node presented by the gate of transistor 12 and completes the REFRESH operation.

Assuming a logic "0" is stored on storage node 21, then the raising of flag line 17 and mask line 18 has no effect on digit line 19. Transistor 13 and voltage variable capacitor 22 are in the off state. Voltage variable capacitor 22 is thus effectively removed from the circuit. Since transistor 13 is in the off state, the voltage level of lines 17 and 18 is blocked and no signal is coupled to digit line 19.

As noted above, a content addressed memory is obtained by adding the exclusive-OR function to each memory cell of a conventional memory. FIGS. *6a* and *6b* illustrate, again in the standard and "bubble" symbolism respectively, the exclusive-OR portion of the content addressed memory cell in accordance with the present invention. In these figures, the exclusive-OR portion of the memory cell has been re-arranged to more clearly indicate the three inputs and the output of the circuit. The exclusive-OR property of the memory cell in accordance with the present invention is utilized during a content addressed search. The exclusive-OR function itself may be written as the following logic equation:

$$f=S\cdot\bar{D}+\bar{S}\cdot D=S\cdot D$$

The above equation is read "as an output is obtained if *S* exists and *D* does not or if *S* does not exist and *D* does." The logic utilized in the present invention is, strictly speaking, an "equivalence" logic function since the flag line is maintained high during a match operation. The equivalence function is written as $f = S\cdot D + \bar{S}\cdot\bar{D}$, that is, $S \equiv D$, which is the logical inverse of "exclusive-OR."

It should be noted with respect to the memory cell of the present invention, and in particular with respect to the equivalence logic provided, that the memory cell is asymmetrical in that a signal representing a logic "0" or a logic "1" is stored but that the complement of the stored information is not also stored. In memory cells of the prior art, a content addressed memory cell generally comprises two storage nodes for storing the desired logic information and the complement of the logic information. This has been necessary to provide the four portions of the above noted logic equations, namely $S$, $\bar{S}$, $D$ and $\bar{D}$.

In the memory cell of the present invention, storing the complement of the stored logic information is not necessary although, due to the equivalence circuit, the memory cell in accordance with the present invention acts as though the complement were stored. Thus, the equivalence portion of the memory cell has only three inputs and further requires only three transistors to obtain the necessary equivalence function.

Referring to FIGS. 6a and 6b, mask line 18 corresponds to the $\bar{D}$ input to the equivalence circuit, digit line 19 corresponds to the D input, and storage node 21 provides the S input. Voltage variable capacitor 22 is shown connected in the equivalence circuit by dashed lines so that FIGS. 6a and 6b may represent the logic portion of either memory cell 10 or memory cell 20.

The operation of the equivalence logic is as described above in connection with FIGS. 1a, 1b, 4a, and 4b in a SEARCH operation.

During an associative SEARCH, the information applied to mask and digit lines 18 and 19 is compared with the information stored on storage node 21. The following "truth table" represents the operation of the equivalence logic in response to various combinations of inputs:

| Search | Stored | Flag |
|---|---|---|
| 1 | 1 | stays high |
| 0 | 1 | discharges |
| 1 | 0 | discharges |
| 0 | 0 | stays high |

Thus an equivalence circuit is provided in which the equivalence determination between two variables is obtained with the minimum number of input lines and a minimum number of circuit components.

There is thus provided by the present invention a memory cell for a content addressed memory in which a particular bit in a word can be changed without modifying the remainder of the word. This gives a memory in accordance with the present invention a "bit slice" write capability. As is known, "bit slice" write capability means that, in a 100 bit by 8,000 word memory for example, a particular bit in some or all of the words can be changed simultaneously. Thus, for example, a "bit slice" comprising the 10th bit in every word can be changed as desired. Viewed another way, the entire memory can be changed in 100 bit slice WRITE operations, sometimes referred to as "broadside loading," as opposed to the 8,000 operations necessary to change the memory on a word by word basis. Further by the addition of a voltage variable capacitor the overall operation of the memory cell can be enhanced. In particular, the operating speed of the memory cell for the read and search operations is increased and the output voltage obtained from the memory cell is increased.

Having thus described the invention it will be apparent to those of skill in the art that various modifications can be made within the spirit and scope of the present invention. As noted above, other signal waveforms may be used to achieve the READ, WRITE, SEARCH and REFRESH operations. For example, during the READ operation the pulse on mask line 18 can be omitted, although this will decrease the current to digit line 19. Also, the SEARCH operation can be a search-with-mask in which the mismatch of particular bits in a word are ignored. This is accomplished by raising both the mask and the digit line of a particular cell. No contribution is made by that cell to the state of the flag line. In terms of the previously noted logic equations, raising both the mask and digit lines presents high $D$ and $\bar{D}$ inputs to the equivalence circuit. The logic equation can then be reduced to

$$f = S + \bar{S}.$$

Since either $S$ or $\bar{S}$ will always exist, the output remains high.

What I claim as new and desire to secure by Letters Patent of the United States is:

1. A content addressed memory cell comprising:
first and second pairs of access lines;
first, second and third metal-oxide-semiconductor transistors connected in a cascading relationship and coupled between said first pair of access lines, wherein the gate of said third transistor forms the storage node of said memory cell, the gate of said first transistor is connected one of said first pair of access lines, and said second transistor isolates said storage node from the condition of said first transistor; and
said second pair of access lines are connected one each to the drains said first ad second transistors.

2. A content addressed memory cell as set forth in claim 1 and further comprising:
a fourth transistor having its source-drain path connecting the second of said first pair of access lines to the source of said third, said fourth transistor having the gate and drain thereof connected together to form a diode.

3. A content addressed memory cell as set forth in claim 2 and further comprising:
a fifth transistor having its source-drain path connecting the junction of said diode and the cascaded transistors to the drain said first transistor and the access line of said second pair connected thereto, said fifth transistor having the gate thereof coupled to the gate of said fourth transistor.

4. A content addressed memory as set forth in claim 3 and further comprising
an MOS voltage variable capacitor connecting said storage node to said second of said first pair of access lines.

5. A content addressed memory cell comprising:
first, second, third and fourth access lines;
first, second and third transistors, connected in a cascading relationship and coupled between said first and second access lines, wherein the gate of said third transistor forms the storage node of said memory cell, the gate of said first transistor is connected to said first access line, and said second transistor isolates said storage node from the condition of said first transistor; and
an equivalence circuit, comprising said third transistor and a fourth and a fifth transistor, having three inputs and an output, said three inputs connected one each to said third and fourth access lines and said storage node, and said output connected to said second access line.

6. A content addressed memory cell as set forth in claim 5 further comprising:
voltage variable capacitor means, coupled between said storage node and said second access line, for coupling signals to said storage node when a signal is stored on said storage node activating said third transistor.

7. A content addressed memory cell comprising:

first, second, third and fourth access lines;

first, second and third metal-oxide-semiconductor transistors connected in a cascaded circuit, in which the source of the first transistor is connected to the gate of the second transistor and the source of the second transistor is connected to the gate of the third transistor, the gate of the first transistor being connected to said first access line and the gate of said third transistor forming the storage node of said memory cell;

a diode connecting the source of said third transistor to said second access line;

a fourth metal-oxide-semiconductor transistor having the source-drain path thereof interconnecting said third access line and the junction of said diode and third transistor, and its gate coupled to said second access line;

said second and third transistors having the drains thereof connected together to said fourth access line; and said first transistor having the drain thereof connected to said third access line.

8. A content addressed memory cell as set forth in claim 7 wherein said diode comprises:

a fifth metal-oxide-semiconductor transistor having the gate and drain thereof connected together to said second access line and the source thereof connected to the source of said third transistor.

9. A content addressed memory cell as set forth in claim 8 and further comprising:

voltage variable metal-oxide-semiconductor capacitor means interconnecting said storage node and said second access line.

10. A content addressed memory as set forth in claim 9 wherein:

said voltage variable capacitor comprises a drain electrode and a gate electrode, said drain electrode connected to said second access line and said gate electrode connected to said storage node.

* * * * *